United States Patent [19]

Heine

[11] Patent Number: 4,463,992
[45] Date of Patent: Aug. 7, 1984

[54] HIGH CAPACITY NEEDLE BEARING FOR LINEAR MOTION ON A SHAFT

[75] Inventor: Otto R. Heine, Poway, Calif.

[73] Assignee: R & H Technology Inc., Minneapolis, Minn.

[21] Appl. No.: 441,493

[22] Filed: Nov. 15, 1982

[51] Int. Cl.³ .............................................. F16C 29/06
[52] U.S. Cl. .................................................... 308/6 C
[58] Field of Search .............. 308/6 C, 6 R, 4 R, 4 C, 308/3 A

[56] References Cited

U.S. PATENT DOCUMENTS

| | | | |
|---|---|---|---|
| 3,037,821 | 6/1962 | Schutz | 308/6 |
| 3,446,540 | 5/1969 | Geffner | 308/6 |
| 3,582,160 | 6/1971 | Schutz | 308/6 |
| 3,606,499 | 9/1971 | Ganser et al. | 308/6 C |
| 3,692,371 | 9/1972 | Geffner | 308/6 C |
| 3,751,121 | 8/1973 | Geffner | 308/6 C |
| 4,025,128 | 5/1977 | Geffner | 308/6 C |
| 4,181,375 | 1/1980 | Ernst et al. | 308/6 C |

OTHER PUBLICATIONS

Thomson, "Roundway Bearings", 1975 (product brochure).

Primary Examiner—Lenard A. Footland
Attorney, Agent, or Firm—Klein, Szekeres & Fischer

[57] ABSTRACT

A linear bearing assembly is disclosed wherein a plurality of roller members continuously circulate to provide area-to-area contact between the load bearing surfaces. A stationary member of the assembly is an elongated member such as a shaft having a curvilinear bearing surface preferably of convex cylindrical curvature. A bearing race which substantially surrounds the cross section of the shaft has in its interior a plurality of bearing surfaces of substantially the same curvature as the bearing surface of the shaft. The roller members are configured to be complementary to the bearing surfaces of the shaft and of the race, and to roll between said bearing surfaces. The race transmits the load carrying forces to a bearing housing to which an object, such as a machine part, is mounted. The bearing race and the housing jointly comprise channels wherethrough the rollers continuously return to occupy their operative positions between the bearing surfaces of the race and the shaft.

20 Claims, 6 Drawing Figures

U.S. Patent  Aug. 7, 1984  4,463,992
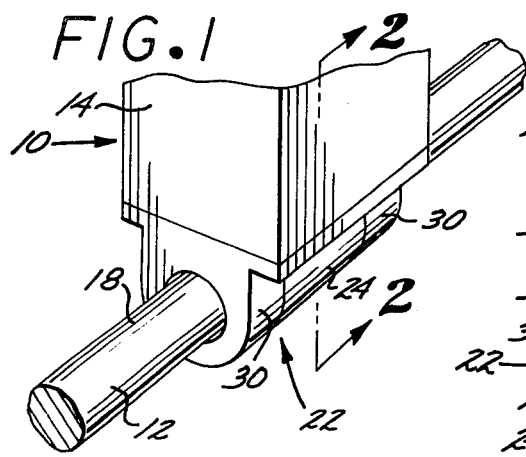
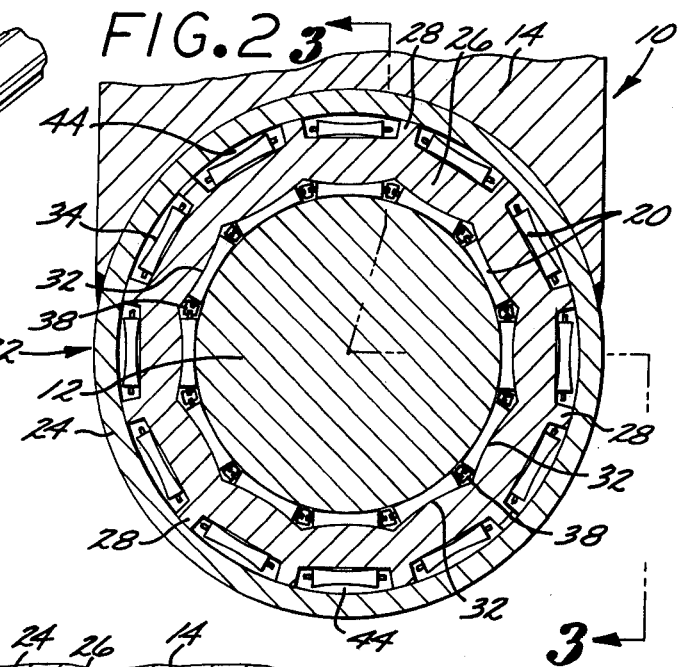
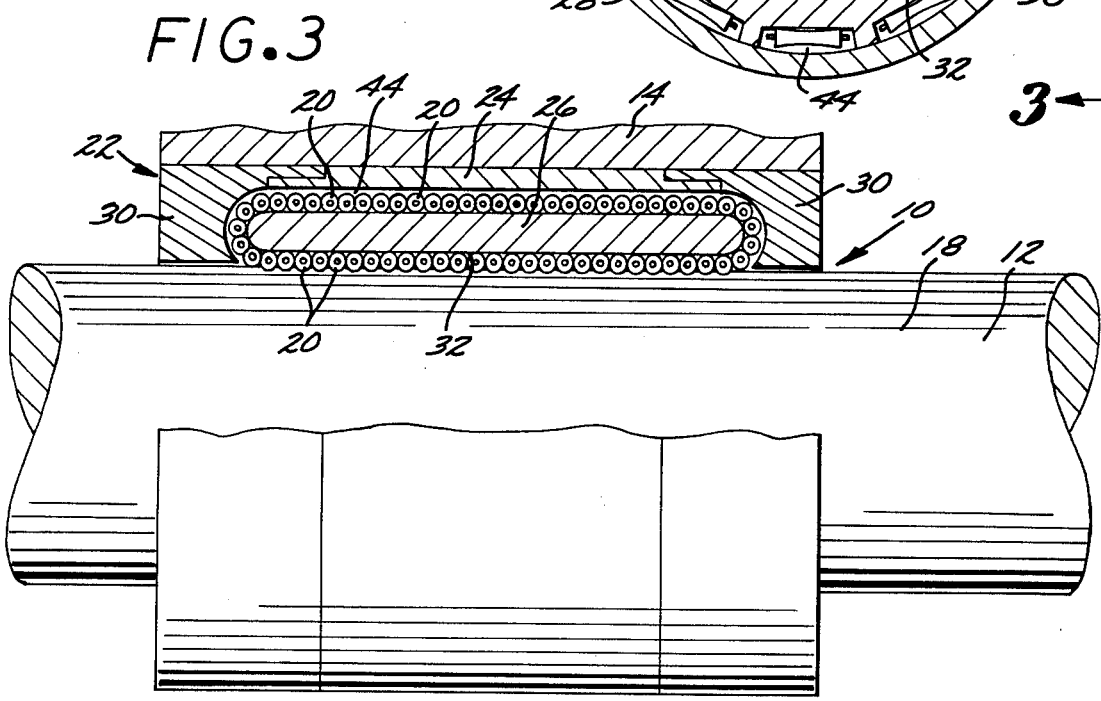
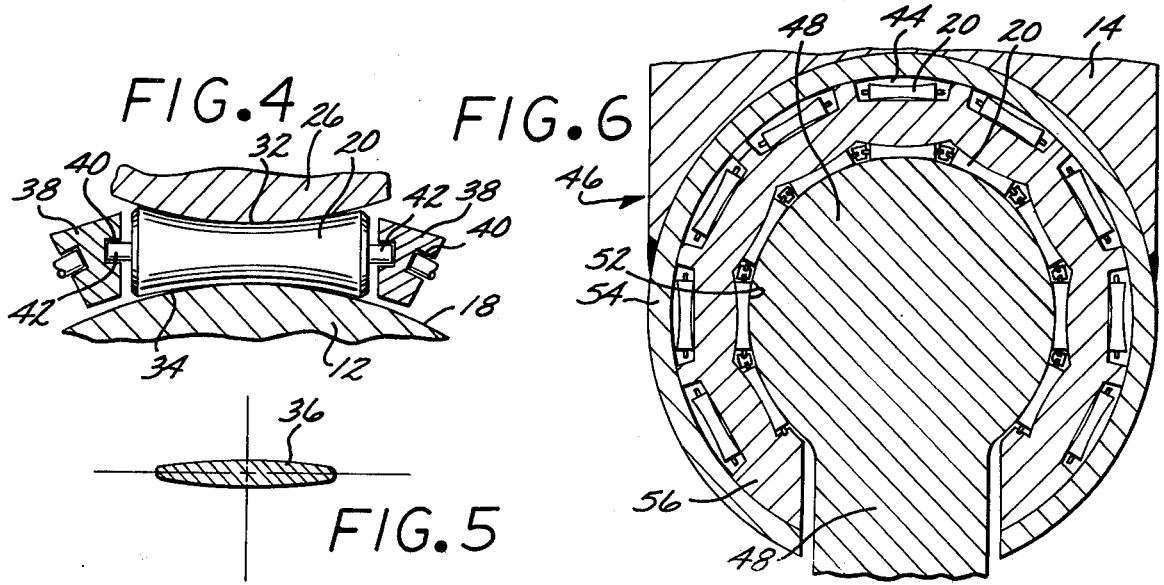
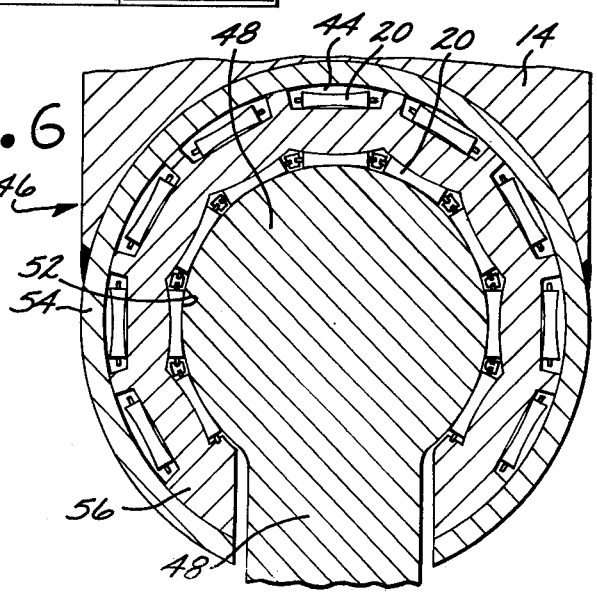

HIGH CAPACITY NEEDLE BEARING FOR LINEAR MOTION ON A SHAFT

BACKGROUND OF THE INVENTION

1. Field of the Invention

The present invention is directed to a bearing assembly adapted for facilitating linear motion on a shaft or the like. More particularly, the present invention is directed to a bearing assembly having high weight and force bearing capacity and adapted for linearly moving an object on a shaft.

2. Brief Description of the Prior Art

Bearings are well known in the prior art. As is well recognized, bearings which facilitate linear motion of an object or machine part on an elongated member, such as a shaft or rail, must meet different requirements than bearings adapted for facilitating rotary motion. Nevertheless, such bearings (hereinafter referred to as linear bearings) are practically ubiquitous in machine tools and many other mechanical applications. Often, linear bearings must be able to withstand very high weight and force loads, and must be able to function with high precision of movement and very low friction.

One type of linear bearing of the prior art operates on the simple principle of sliding friction. In other words, a bearing surface simply slides on a suitably contoured shaft or rail. In this type of bearing, friction forces are high, and under static conditions lubricant is readily forced out from between the overlapping sliding surfaces. Therefore, this type of simple bearing binds readily, is subject to undue wear, and requires unduly high input of power to operate.

Wheel and track arrangements are often used in lieu of linear bearings. These, however, are bulky, expensive and often still fail to provide the required degree of precision.

An alternative linear bearing of the prior art includes a bushing which has a plurality of balls adapted for rolling motion between the bushing and a shaft when the bushing is moved on the shaft. Channels or guides are provided in the interior of the bushing to circulate the balls so that a predetermined number of the balls are always available for rolling between the bushing sleeve and the shaft. Such ball bushings are manufactured by Thomson Industries of Manhasset, N.Y., and are described in a brochure of said company.

A disadvantage of ball bushings is that only point contact occurs between the weight supporting or force bearing balls and the shaft, (or the balls and the bushing). Therefore, in order to provide high load bearing capacity, relatively large balls are required. This, in turn, means that no more than 5 or 6 ball return channels may be incorporated into a single ball bushing. Consequently, relatively high contact stresses occur in the ball bushings, and the ball bushing shaft assembly is relatively bulky for any given load application. Furthermore, it is subjected to relatively high degree of wear.

Still another alternative linear bearing of the prior art is known under the tradename of "ROUNDWAY bearing" of the Thomson Industries Company of Manhasset, N.Y. This bearing, also described in a brochure of said company, utilizes a plurality of rollers connected to one another in a flexible endless chain. The rollers roll between a cylindrical shaft and a likewise cylindrical bearing race. Although this bearing is capable of supporting high loads, one of its disadvantages is that it does not resist side loads. Furthermore, this bearing too, is relatively bulky for any given load application.

For still further background to the present invention, and particularly for bearings which are capable of both linear and rotary motion on a shaft, reference is made to the following U.S. Pat. Nos.: 4,025,128; 3,446,540; 3,751,121; 3,582,160; 3,037,821; and 3,692,371.

In light of the foregoing, the need in the prior art is apparent for a linear bearing which provides high load supporting capacity, high wear resistance, and is very compact relative to the loads it is capable of supporting. The present invention provides such a linear bearing.

SUMMARY OF THE INVENTION

It is an object of the present invention to provide a linear bearing which has high load supporting capacity.

It is another object of the present invention to provide a linear bearing which is highly compact relative to the load it is capable of supporting.

It is still another object of the present invention to provide a linear bearing wherein line or area-to-area contact occurs between the load bearing moving parts, and which, therefore, suffers only minimal wear during normal use.

These and other objects and advantages are attained by a linear bearing asembly which has a bearing housing and a bearing race assembled to the housing so that the bearing race transmits load carrying forces to the housing. The housing supports an object, such as a machine part, which is to be linearly moved by the bearing assembly on an elongated member, such as a shaft.

The bearing race has an internal surface which is disposed relative to a curvilinear bearing surface of the elongated member in such a manner that the internal surface envelopes or surrounds the cross sectional area of the bearing surface of the elongated member.

The internal surface has at least one, and preferably a plurality of bearing surfaces, which have substantially the same curvature as the bearing surface of the elongated member. A plurality of roller or needle members are disposed between the bearing surfaces of the race and the bearing surface of the elongated member. Each of the roller members has a curvilinear bearing surface complementary to the bearing surfaces of the race and of the elongated member. The roller members roll between the race and the elongated member and provide line contact under no-load condition or area-to-area contact under load condition relative to the race and the bearing surface of the elongated member. Channels or guides are provided in the housing to permit substantially continuous circulation of the roller members in bearing assembly for intermittent load bearing and rolling contact with the race and the bearing surface of the elongated member.

The features of the present invention can be best understood, together with further objects and advantages, by reference to the following description taken in connection with the accompanying drawings wherein like numerals indicate like parts.

BRIEF DESCRIPTION OF THE DRAWINGS

FIG. 1 is a schematic perspective view of a first preferred embodiment of the bearing assembly of the present invention, the view partially showing an object or machine part mounted to the bearing assembly;

FIG. 2 is a cross-sectional view of the first preferred embodiment of the bearing assembly of the present invention, the cross-section being taken on lines 2,2 of FIG. 1;

FIG. 3 is another view, partly in cross-section of the first preferred embodiment of the bearing assembly of the present invention, the cross-section being taken on lines 3,3 of FIG. 2;

FIG. 4 is an enlarged view, partly in cross-section, showing a roller or needle element of the bearing assembly of the present invention interfacing with adjacent bearing surfaces of a bearing race and an elongated shaft;

FIG. 5 is an enlarged view showing the configuration of a typical contact area of a roller or needle member of the bearing assembly of the present invention with an adjacent bearing surface of the shaft or of the race, and FIG. 6 is a cross-sectional view of a second preferred embodiment of the bearing assembly of the present invention.

DESCRIPTION OF THE PREFERRED EMBODIMENTS

The following specifications taken in conjunction with the drawings sets forth the preferred embodiment of the present invention. The embodiments of the invention disclosed herein are the best modes contemplated by the inventor for carrying out his invention in a commercial environment, although it should be understood that various modifications can be accomplished within the parameters of the present invention.

Referring now to FIGS. 1–5, the first preferred embodiment of the linear bearing assembly 10 of the present invention is disclosed. It is noted with reference to the introductory section of the present application for patent that the bearing assembly 10 of the present invention is specifically adapted for facilitating linear movement of an object, such as a machine part, on an elongated member, such as a shaft 12, shown on FIGS. 1–3. The object, or machine part 14, is only schematically shown on the drawing Figures. As it will be readily understood by those skilled in the art, the specific nature of the object or machine part 14 is not important for the purposes of the present invention.

Furthermore, the linear bearing assembly 10 of the present invention has numerous applications in the mechanical arts such as in various machine tools. Generally speaking its use is highly advantageous in applications wherein low friction movement of a part is desired on an elongated member such as a rail or the shaft 12. Still further, as it will become apparent from the ensuing description, the bearing assembly 10 of the present invention is highly adapted for use in machines, particularly machine tools wherein a high degree of precision of movement of the linear bearing on a shaft or the like is required. In these applications, "binding" and "chatter" of the bearing and loss of alignment due to wear, is particularly impermissible.

In accordance with the present invention, the elongated member or shaft 12 has a curvilinear bearing surface 18. Preferably, the curvilinear bearing surface 18 of the shaft 12 is a convex surface of cylindrical curvature as is shown on FIGS. 1–4 in conjunction with the first preferred embodiment 10. For the purposes of the present description, the term "convex surface of cylindrical curvature" is defined as the outer curved surface of a cylindrical body which in a cross-section taken in a plane perpendicular to the longitudinal axis of the cylindrical body is bounded by a circle or a segment of a circle. Furthermore, for the purposes of the present description the term "concave surface of cylindrical curvature" is defined as the inner surface of a hollow cylindrical body which, in a cross-section taken in a plane perpendicular to the longitudinal axis of the hollow cylindrical body is bounded by a circle or a segment of a circle. Such a concave surface is on FIGS. 2, 4 and 6 shown in conjunction with the roller or needle members 20 used in the bearing assembly 10 of the present invention.

Thus, in the first preferred embodiment, the outer surface of the cylindrical shaft 12 comprises the bearing surface 18. The length of the shaft 12 is not important for the purposes of the present invention. The bearing assembly 10 is adapted for moving on the bearing surface 18 of the shaft 12 for any length, limited only by the nature of the machinery or device (not shown) wherein the bearing assembly 10 is incorporated.

Referring now particularly to FIGS. 2 and 3, the bearing assembly 10 is shown to include a bearing housing 22. The bearing housing 22 mounts the machine part 14 which is moved by the bearing assembly 10. The nature of mounting the machine part 14 to the housing 22 is not critical. It may be accomplished by conventional means, such as bolting, or welding the machine part 14 to the housing 22.

In the preferred embodiment of the bearing assembly 10 of the present invention, the shaft 12 has a circular cross section, and the bearing housing 22 comprises a hollow tubular member 24, as is shown on FIG. 2. The bearing assembly 10 further includes a bearing race 26. The bearing race 26 is mounted in the housing 22 in such a manner that the bearing race 26 transmits load carrying forces to the housing 22.

More specifically, in the first preferred embodiment of the bearing assembly 10 of the present invention, the bearing race 26 is an annular member which fits into the tubular member 24 of the housing 22. The race 26 is in physical contact with the housing 22 through a plurality of outwardly protruding, regularly spaced bosses 28, best shown on the cross-sectional view on FIG. 2. Although various ways of mounting the bearing race 26 to the housing 22 may become readily apparent to those skilled in the art in light of the present disclosure, a preferred way of mounting the bearing race 26 to the housing 22 is to provide a fit of close tolerances so that the race 26 must be cooled to contract, or the tubular member 24 must be heated to expand, for assembly. FIGS. 1 and 3 also show two side cover members 30 mounted to the sides of the tubular member 24 of the housing 22 to enclose the race 26 therein.

As an important feature of the present invention, the bearing race 26 includes an interior surface wherein a plurality of bearing surfaces 32 are provided. The bearing surfaces 32 are curvilinear surfaces of substantially the same curvature as the bearing surface 18 of the shaft 12. Preferably, the curvature of the bearing surfaces 32 of the race 26 is identical with curvature of the bearing surface 18 of the shaft 12 to the extent rendered possible by conventional machining techniques.

As is shown on FIG. 2, the bearing surfaces 32 of the race 26 preferably are regularly and evenly spaced around the inner periphery of the annular race 26. Thus, in the first preferred embodiment, each bearing surface 32 of the race 26 is a convex surface of cylindrical curvature. The bearing surfaces 32 are aligned with their longitudinal axes parallel with the longitudinal axis of the race 26 and the shaft 12.

With further specific reference to FIG. 2, the race 26 is shown to be concentrically aligned with the shaft 12. A space is available between the bearing surface 18 of the shaft 12 and the bearing surface 32 of the race 26 to accept a plurality of the roller or needle members 20.

Each roller or needle member 20 is a substantially elongated member, having, in the assembled structure, its longitudinal dimension disposed transversely to the longitudinal axis of the shaft 12. Each roller or needle member 20 has a concave curvilinear bearing surface 34, which is complementary in configuration to the bearing surfaces 32 of the race 26 and of the shaft 12. Preferably, as is shown for the first preferred embodiment of the bearing assembly 10 of the present invention, the bearing surfaces 34 of the roller members 20 have a slightly larger radius than the bearing surfaces 32 of the race 26 (or of the shaft 12).

As a result of the herein-above described configuration of the bearing surfaces 32 and 18, and of the roller members 20, the roller members 20 have area-to-area contact with the respective bearing surfaces 32 and 18 when under load. Such a typical contact area 36 is schematically illustrated on FIG. 5. In the event the radius of curvature of the roller members 20 was identical with the radius of curvature of the bearing surface 32 and 18 (as opposed to being slightly larger as in the preferred embodiments) the contact area would theoretically be reduced to a line under no-load conditions. In either case, area-to-area contact, or even line contact between these continuously moving load bearing bodies is preferable to the point-to-point or circular area contact which is provided in the prior art ball containing linear bearings. Consequently, much greater load bearing capacity and significantly lesser wear is afforded by the linear bearing assembly 10 of the present invention than by the prior art ball containing linear bearings.

Referring still principally to FIGS. 1 and 2, the roller or needle members 20 are shown densely packed in the bearing assembly 10 around the circular periphery of the shaft 12. A series of roller or needle members 20 is shown to be associated with each bearing surface 32 of the race 26. The rollers or needle members 20 are spaced from one another and are kept in correct alignment relative to the bearing surfaces 32 by appropriate spacers 38.

Construction of the spacers 38 is best shown on FIG. 4. Thus, each spacer is an elongated member having a groove or channel 40 in each of its two, oppositely facing sides. A cylindrical extension 42 of each roller or needle member 20 rides in the groove or channel 40. The cylindrical extension 42 has a relatively loose fit in the groove or channel 40 so that friction therein is minimized. A principal purpose of the spacers 38 is to prevent the roller or needle members 20 from falling out of the bearing when the asembled bearing housing 22, race 26 and roller members 20 are removed from the shaft 12. The spacers 38 are stationary relative to the bearing housing 22 and race 26, and move therewith in a linear motion on the shaft 12.

FIGS. 2 and 3 also illustrate a roller return channels 44 which are provided in association with each bearing surface 32 of the race 26. These permit continuous circulation of the roller or needle members 20 while the linear bearing assembly 10 moves on the shaft 12.

More specifically, the bosses 28 of the race 26 are spaced in such a manner that a channel 44 is formed between the race 26 and the tubular member 24 of the housing 22 above each bearing surface 32 of the race 26. Each channel 44 is in communication with the space below the respective bearing surface 32 as a result of appropriate contouring of the side cover members 30. This is best shown on FIG. 3. Consequently, as the linear bearing assembly 10 moves on the shaft 12, the roller or needle members 20 continuously move up into the return channel 44, and move through the return channel 44 back into operative position between the bearing surfaces 32 of the race 26 and of the shaft 12. Since, in the return channels 44 the roller or needle members 20 support no load, the return channels 44 need not conform to the concave configuration of the rollers 20. Rather, the return channels 44 are bounded on three sides by relatively more easily formed flat surfaces. Spacers 38 are not needed in the return channels 44. As each roller 20 reenters the space between the bearing surface 32 of the race 26 and the shaft 12, it is reengaged by the respective two spacers 38 which are stationarily disposed therein.

Referring now to FIG. 6, a second preferred embodiment 46 of the bearing assembly of the present invention is disclosed. The second preferred embodiment 46 is substantially identical in construction and operation with the first preferred embodiment. However, an important difference between the two embodiments is that a shaft 48 of the second preferred embodiment 46 is supported by a rail 48. Consequently, the shaft 48 of the second preferred embodiment 46 may span longer distances, or may support heavier loads, or both, than the shaft 12 of the first preferred embodiment 10.

Stating the construction of shaft 48 of the second preferred embodiment 46 by different words, a bearing surface 52 of convex cylindrical curvature on which the bearing rides, is formed as part of an elongated member such as a rail 50. Consequently, a tubular member 54 of the bearing housing 22 is an open member, resembling in cross section a segment of an annulus. As is further shown on FIG. 6, a bearing race 56 of the second embodiment 46 is also substantially of the configuration of a segmented annulus or ring. Bearing surfaces 32 of the race 56 are provided to surround the bearing surface 52 of the shaft 48.

During operation of both preferred embodiments 10 and 46 of the bearing assembly of the present invention, force or load is transferred from the shaft 12 or 48 to the roller or needle members 20, to the race 26 or 56. From the race 26 or 56, the force or load is further transferred to the tubular member 24 or 54 of the housing 22. Because the roller or needle members 20 provide line-area-to-area load bearing contact, the load bearing capacity of the bearing assembly is high, Hertzian contact stresses are low, and wear of the moving parts is low. Furthermore, the above-described construction of the bearing assembly permits utilization of roller or needle members 20 of relatively small diameter, and permits very dense packing of the rollers or needle members 20 in the bearing. In light of the foregoing, the bearing assembly of the present invention has very high load capacity relative to its size, and very long useful life.

In alternative embodiments of the bearing assembly of the present invention (not specifically shown here), a plurality of concave bearing surfaces are disposed in the shaft, parallel with the longitudinal axis of the shaft. The race of such an embodiment includes a concave bearing surface, and the roller or needle members have complementary convex surfaces to engage the bearing surfaces of the shaft and of the race.

Still other alternative embodiments or modifications of the bearing assembly of the present invention may become apparent to those skilled in the art in light of the above disclosure. Therefore, the scope of the present invention should be interpreted solely from the following claims.

What is claimed is:

1. A bearing assembly adapted for low friction linear motion on an elongated member including at least one curvilinear bearing surface having a substantially uniform cross-sectional area taken in a plane perpendicular to the longitudinal axis of the elongated member, the assembly comprising:

a housing;

a bearing race assembled to the housing so as to be capable of transmitting a load carrying force to said housing, the bearing race configured for enveloping the cross-sectional area of the bearing surface of the elongated member; one of the elongated member and the bearing race having a plurality of curvilinear bearing surfaces which have substantially identical curvature with the bearing surface of the other of said elongated member and bearing race;

a plurality of circumferentially disposed load carrying roller members disposed in the housing, each of said roller members having a curvilinear surface which is substantially complementary and capable of rolling on the respective curvilinear surfaces of the elongated member and of the bearing race in intimate area rolling contact therewith, a substantial portion of said roller members being disposed in a space between the bearing race and the elongated member when the bearing assembly is mounted to the elongated member, the bearing race and the housing jointly comprising means for substantially continuously circulating said roller members for rolling contact with the bearing race and with the elongated member while the bearing assembly linearly moves on the elongated member.

2. The bearing assembly of claim 1 wherein the bearing race has the plurality of curvilinear bearing surfaces.

3. A bearing assembly adapted for linear motion on an elongated shaft including a bearing surface of convex cylindrical curvature, the bearing assembly comprising:

a housing comprising means for supporting an object to be moved in a linear motion on the shaft;

a bearing race assembled to the housing so as to be capable of transmitting a load carrying force to the housing, the bearing race having an internal surface configured to envelope the bearing surface of the shaft in a direction transverse to the longitudinal axis of the shaft, and for leaving a space between the internal surface and the shaft, the internal surface including a plurality of convex bearing surfaces disposed with their longitudinal axes parallel to one another, each of the bearing surfaces of the race having a cylindrical curvature of substantially the same radius as the bearing surface of the shaft;

a plurality of circumferentially disposed load carrying needle members, each of the needle members having a concave surface configured to conform to the bearing surfaces of the race and of the shaft and adapted for rolling in the space between a bearing surface of the race and the bearing aurface of the shaft, in intimate contact with the bearing surfaces of the race and of the shaft, and means formed in the housing for substantially continuously circulating the needle members for rolling contact with the bearing surfaces of the race and with the bearing surface of the shaft while the bearing assembly linearly moves on the shaft.

4. A bearing assembly adapted for linear motion on an elongated shaft, comprising in combination:

an elongated shaft having at least one surface of substantially cylindrical curvature;

a bearing housing comprising means for supporting an object to be moved in a linear motion on the shaft;

a single bearing race assembled to the housing so as to be capable of transmitting a load carrying force to the housing, the bearing race having an internal surface, and being configured to be mountable to the bearing surface of the shaft with a space between the internal surface of the race and the bearing surface of the shaft, the internal surface of the race further comprising a plurality of bearing surfaces, each bearing surface of the race having its longitudinal axis disposed substantially parallel with the elongated shaft, and each bearing surface having a cylindrical curvature of substantially identical radius to the cylindrical curvature of the shaft;

a plurality of circumferentially disposed needle members, each needle member having a surface of a curvature which is complementary to the cylindrical bearing surfaces of the shaft and of the bearing race and of a radius of substantially the same magnitude, each needle member being adapted for being disposed in the space between the bearing surface of the shaft and one of the bearing surfaces of the race in intimate area contact with said bearing surfaces for rolling motion therein, and means provided in the housing for substantially continuously circulating the needle members for intermittently occupying the space between bearing surfaces with rolling motion therein and for leaving said space and returning to said space whereby the bearing linearly moves on the shaft.

5. The combination of claim 4 wherein the bearing surfaces of the bearing race are convex surfaces, the bearing surface of the shaft is a convex surface, and the surfaces of cylindrical curvature of the needle members are concave surfaces.

6. The combination of claim 5 wherein the substantially cylindrical curvature of the needle members has slightly larger radius than the cylindrical curvature of the bearing surfaces of the race.

7. The combination of claim 4 wherein the elongated shaft has a circular cross section taken in a plane perpendicular to the longitudinal axis of the shaft, and wherein the bearing race is an annular member.

8. The combination of claim 4 further comprising a plurality of spacer members, each spacer member being disposed in the space between the bearing surface of the shaft and the internal surface of the race, each spacer member comprising retaining means for retaining the needle members assembled to the race when the bearing housing, the race and the needle members are removed from the shaft.

9. A bearing assembly adapted for low friction linear motion on an elongated member including a curvilinear convex bearing surface having a substantially uniform cross-sectional area taken in a plane perpendicular to the longitudinal axis of the elongated member, the assembly comprising:

a housing;

a bearing race assembled to the housing so as to be capable of transmitting a load carrying force to said housing, the bearing race configured for enveloping the cross-sectional area of the bearing surface of the elongated member and having a plurality of convex bearing surfaces of substantially cylindrical curvature, substantially identical with the curvature of the bearing surface of the elongated member, each of said plurality of bearing surfaces of the bearing race interfacing with the convex bearing surface of the elongated member;

a plurality of circumferentially spaced load carrying roller members operatively disposed between each bearing surface of the bearing race and the bearing surface of the elongated member when the bearing assembly is mounted to the elongated member, each of said roller members having a concave curvilinear surface which is substantially complementary and capable of rolling on the respective curvilinear surfaces of the elongated member and of the bearing race, the bearing race and the housing jointly comprising means for substantially continuously circulating the roller members for rolling contact with the bearing race and with the elongated member while the bearing assembly linearly moves on the elongated member.

10. The bearing assembly of claim 9 wherein the radius of curvature of the concave curvilinear surfaces of the roller members is slightly larger than the radius of curvature of the convex curvilinear surfaces of the bearing race.

11. The bearing assembly of claim 10 wherein the elongated member is a shaft of a circular cross-section, the bearing race is a substantially annular member of larger internal diameter than the diameter of the elongated member, the bearing race has the convex bearing surfaces disposed in its internal annulus, and wherein the roller members substantially entirely fill the space between the bearing race and the circular shaft.

12. The bearing assembly of claim 11 further comprising a plurality of space members disposed between adjacent roller members.

13. The bearing assembly of claim 10 wherein the cross-section of the curvilinear bearing surface of the elongated member is a segment of a circle, a cross section of the bearing race is substantially configured as a segment of an annulus of larger diameter than the cross section of the elongated member, and wherein the roller members substantially entirely fill the space between the bearing race and the curvilinear surface of the elongated member.

14. The bearing assembly of claim 13 further comprising a plurality of spacer members disposed between adjacent roller members.

15. A bearing assembly adapted for linear motion on an elongated shaft including a bearing surface of convex cylindrical curvature, the bearing assembly comprising:

a housing comprising means for supporting an object to be moved in a linear motion on the shaft;

bearing race assembled to the housing so as to be capable of transmitting a load carrying force to the housing, the bearing race having an internal surface configured to envelope the bearing surface of the shaft in a direction transverse to the longitudinal axis of the shaft, and for leaving a space between the internal surface and the shaft, the internal surface including a plurality of convex bearing surfaces disposed with their longitudinal axes parallel to one another, each of the bearing surfaces of the race having a cylindrical curvature of substantially the same radius as the bearing surface of the shaft;

a plurality of circumferentially spaced load carrying needle members, each of the needle members having a concave surface of cylindrical curvature of slightly larger radius than the radius of the cylindrical curvature of the bearing surfaces of the race, the load carrying needle members being adapted for rolling in the space between a bearing surface of the race and the bearing surface of the shaft, in intimate contact with the bearing surfaces, and means formed in the housing for substantially continuously circulating the needle members for rolling contact with the bearing surfaces of the race and with the bearing surface of the shaft while the bearing assembly linearly moves on the shaft.

16. The bearing assembly of claim 15 further comprising spacer members mounted in the space between the bearing surface of the shaft and the interior surface of the race, one spacer member being mounted between two needle members.

17. The bearing assembly of claim 16 wherein the needle members are mounted immediately adjacent to one another having only the spacer members between adjacent two needle members.

18. The bearing assembly of claim 16 wherein the spacer members comprise retaining means for retaining the needle members mounted to the race when the bearing assembly is not mounted to the shaft.

19. The bearing assembly of claim 15 wherein the race is a substantially annular member and entirely envelopes the circular cross-section of the shaft.

20. A bearing assembly of claim 15 wherein the race is configured substantially as a segment of an annulus.

* * * * *